United States Patent [19]

Moss

[11] 4,448,030
[45] May 15, 1984

[54] COMBINED STAGED AIR CONDITIONER AND HEAT STORE

[75] Inventor: Gerald Moss, Wantage, England

[73] Assignee: Exxon Research and Engineering Co., Florham Park, N.J.

[21] Appl. No.: 326,532

[22] Filed: Dec. 2, 1981

[51] Int. Cl.$^3$ .............................................. F25B 7/00
[52] U.S. Cl. ....................................... 62/79; 62/101; 62/122; 62/235.1; 62/238.3
[58] Field of Search ................... 62/235.1, 238.3, 101, 62/122, 79

[56] References Cited

U.S. PATENT DOCUMENTS

| | | | |
|---|---|---|---|
| 2,027,610 | 1/1936 | Nesselmann et al. | 62/119 |
| 2,182,098 | 12/1939 | Sellew | 62/179 |
| 3,483,710 | 12/1969 | Bearint | 62/79 |
| 4,205,529 | 6/1980 | Ko | 62/235.1 |
| 4,337,625 | 7/1982 | Wilkinson | 62/238.3 X |
| 4,373,347 | 2/1983 | Howell et al. | 62/235.1 X |

Primary Examiner—Albert W. Davis, Jr.
Attorney, Agent, or Firm—Joseph J. Dvorak

[57] ABSTRACT

Apparatus for carrying out a combined absorption and adsorption process comprising an adsorber (1) housing adsorbent (30) (e.g. 13×zeolite molecular sieve) and having means (2) for supplying heat to the adsorbent (30) from an external source, a vapor outlet in said adsorber connected by conduit (31) to a heat exchanger (4) capable of supplying heat to the working fluid of the generator (5) of an absorber system, means (19) for transferring heat to the generator (5) from the external source of heat, an expansion valve (6) connected by conduit (32) to said heat exchanger (4), an evaporator (7) connected by conduit (32) to said expansion valve (6) and also connected by conduit (35) to the adsorber (1), said absorber system comprising said generator (5) connected by conduit (8) to a condenser (9), an expansion valve (11) connected by conduit (40) to said condenser (9), an evaporator (7) connected by conduit to said expansion valve (11) and an absorber (13) connected by conduit (34) to said evaporator (7) and connected by two separate conduits (41, 42) to the generator (5), one conduit (42) having an expansion valve (15) therein.

5 Claims, 1 Drawing Figure

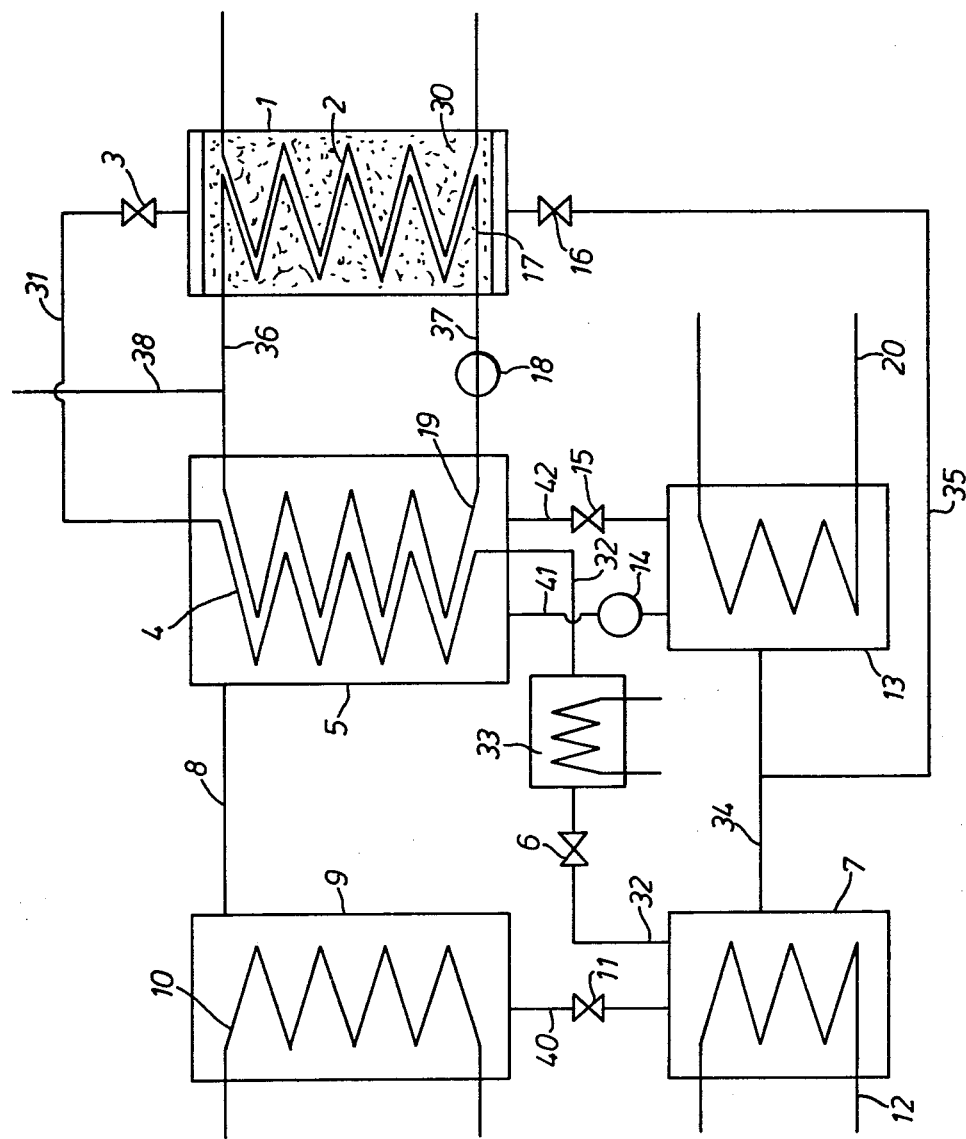

COMBINED STAGED AIR CONDITIONER AND HEAT STORE

This invention relates to adsorption and absorption heat pumps.

A normal absorption air conditioner using water and lithium bromide as working fluids is capable of pumping heat from 7° C. to 40° C. at a coefficient of performance (C.O.P.) of 0.7 when supplied with heat at 90° C. We have now devised a system involving the combination of adsorption and absorption heat pumps in such a way so as to provide energy and storage with a greatly enhanced C.O.P. for air conditioning applications, for example as high as 1.9.

According to this invention a combined adsorption and absorption process is one wherein an external source of heat is used to remove adsorbate vapour from adsorbent housed in an adsorber, adsorbate vapour is condensed and the latent heat of condensation thereby produced is used by means of heat exchange to remove absorbate from the working fluid in the generator of an absorption system, said system also including a condenser, an evaporator and an absorber, condensed adsorbate is expanded and delivered to a second evaporator where external heat is abstracted and where the adsorbate evaporates and intermittently vaporised adsorbate from the second evaporator is delivered to the adsorber for re-adsorption by the adsorbent yielding heat of adsorption which by heat exchange is delivered to the working fluid in the generator.

In a preferred embodiment there is only one evaporator and the absorbate and the adsorbate are one and the same substance. The process operates in the same way except that adsorbate condensed after heat exchange with the working fluid in the generator and after expansion is delivered to the evaporator of the absorption system where external heat is abstracted and where the adsorbate evaporates. Thereafter some of the vaporised adsorbate from the evaporator is delivered to the absorber where it is absorbed yielding heat of absorption. Intermittently some of vaporised adsorbate from the evaporator is delivered to the adsorber for re-adsorption, etc as described above.

In cases where the system acts as a chiller it is also desirable that the condensed adsorbate before being expanded is cooled to approximately the heat rejection temperature of the evaporator which may for example be about 40° C.

In the process of the invention the intermittent delivery of the vaporised adsorbate from the or the second evaporator occurs when the source of external heat used in removing adsorbate vapour from the adsorber is shut off.

The process of absorption is conventional as applied to the process of the invention; that is to say absorbate (which in the preferred embodiment is the same as the adsorbate) is driven off from the generator by heat supplied indirectly from the heat of condensation or heat of adsorption of adsorbate, vaporised adsorbate is condensed in the condenser, rejecting heat of condensation, condensed absorbate after being expanded is sent to the evaporator where it evaporates and from the evaporator vaporised adsorbate is delivered to the absorber where the heat of absorption is rejected. Weak working fluid solution is pumped from the absorber to the generator and strong working fluid solution is delivered from the generator to the absorber via an expansion valve.

Apparatus for carrying out the process of the invention comprises an adsorber housing adsorbent being provided with means for supplying heat to the adsorbent from an external source. These means usually comprise a heat exchanger housed in the adsorber surrounded by adsorbent, the heat exchanger being supplied with heated heat transfer fluid from a source of external heat, e.g. an electrical resistive heater, a boiler heated by gas or oil, or by a high temperature solar radiation collector.

The adsorber is provided with a vapour outlet which is connected, usually by valved conduit, to a heat exchanger which is positioned so as to be capable of supplying heat to the working fluid in the generator of the absorber system. Usually this heat exchanger will be located within the generator so that there is direct contact between the heat exchanger and the working fluid within the generator.

There are also means for transferring heat from an external source of heat to the generator, e.g. from said above-mentioned external source of heat. This is usually by means of two heat exchangers connected together by means of a conduit provided with a circulation pump. One of the heat exchangers is in heat exchange relationship with the heat exchanger housed in the adsorber and the other heat exchanger is in heat exchange relationship with the heat exchanger capable of supplying heat to the working fluid in the generator. A suitable heat exchanger for use in the adsorber is the one described and claimed in our copending U.K. patent application No. 8,036,901.

The absorber part of the apparatus is more or less conventional. The generator wherein rich working fluid is concentrated by heating and absorbate is removed as vapour is connected by conduit to a condenser in which absorbate vapour is condensed. The heat of condensation is rejected in this condenser, usually by means of a heat exchanger housed within the condenser.

There is an expansion valve connected by conduit to the condenser and condensed absorbate is expanded through this valve with a drop in temperature. This expansion valve is connected by conduit to an evaporator. In this evaporator which is at a lower pressure than that of the condenser heat is abstracted from the atmosphere, usually by means of a heat exchanger located in the evaporator and the absorbate evaporates.

The evaporator is connected by conduit to an absorber operating at about the same pressure as the evaporator and which houses the working fluid of the absorber system. Here the rich working fluid is diluted by vaporised absorbate. In the absorber there is usually a heat exchanger so that heat of absorption can be rejected to the atmosphere.

The generator and absorber are connected together by two separate conduits, one conduit being provided with an expansion valve. Weak working fluid is conveyed from the absorber to the generator usually by means of a pump, whilst strong working fluid from the generator is conveyed, through the expansion valve to the absorber.

The heat exchanger connected to the vapour outlet of the adsorber is also connected by conduit to an expansion valve. This means that adsorbate vapour after condensing in the heat exchanger positioned to supply heat to the working fluid in the generator passes through this expansion valve where it is reduced in pressure. Preferably when the system acts as a chiller there are cooling means, e.g. a heat exchanger located upstream of this expansion valve, so that the adsorbate is cooled before it is expanded.

The expansion valve is connected by conduit to an evaporator. This may either be an evaporator for adsorbate, i.e. that termed the second evaporator, separate from the evaporator of the absorber system, or is preferably the same evaporator as that used in the absorber system in which case the adsorbate and absorbate are one and the same substance.

When a second evaporator is used the expanded adsorbate is delivered to this evaporator, heat is abstracted from the atmosphere and the adsorbate evaporates. This second evaporator is connected to the adsorber by a conduit preferably being provided with a valve. When it is desired to adsorb adsorbate in the adsorber, vaporised adsorbate is drawn from this second evaporator to the adsorber through this conduit.

When in the preferred embodiment adsorbate is delivered to the evaporator of the absorber system, vaporised adsorbate leaves the evaporator and is delivered both to the absorber and to the adsorber. Thus, a simple conduit can connect the evaporator and the absorber and this can be provided with a branch conduit leading to the adsorber. This branch conduit is preferably provided with a valve, and it is through this branch conduit that vaporised adsorbate is drawn when it is desired to adsorb adsorbate in the adsorber.

The preferred adsorbent/adsorbate system in Y-zeolite molecular sieve/water, but another suitable combination of adsorbent and adsorbate is activated charcoal/ethanol.

The preferred working fluid in the absorber system is aqueous lithium bromide, but other suitable fluids are methanol and lithium bromide, ammonia and water and ammonia and sodium thiocyanate.

The conduit connecting together the heat exchanger in the adsorber and the heat exchanger in the generator usually contains water under pressure so that heat can be supplied by liquid water at about 150° C. Alternatively a low vapour pressure heat transfer fluid e.g. Dowtherm A may be used in this circuit.

As an illustration of how this combined adsorption and absorption system works there follows some data. A normal absorption air conditioner using water and lithium bromide as working fluid is capable of pumping heat from 7° C. to 40° C. at a C.O.P. of 0.7 when supplied with heat at 90° C. When Y-zeolite molecular sieve is stripped of water at 150° C. the stripped vapour can be condensed at 90° C. to operate the absorber system. For every 1510 BThU per lb ($3.51 \times 10^6$ J/kg) used to strip the adsorbent 1000 BThU/lb ($2.326 \times 10^6$ J/kg) is delivered to the absorber system in order to refrigerate 700 BThU/lb ($1.628 \times 10^6$ J/kg). The adsorbent may then be used to refrigerate another 1000 BThU/lb ($2.326 \times 10^6$ J/kg) releasing 1510 BThU/lb ($3.51 \times 10^6$ J/kg) in the process at 90° C. However this 1510 BThU/lb ($3.51 \times 10^6$ J/kg) may be fed into the absorber system where it will refrigerate another 1057 BThU/lb ($2.46 \times 10^6$ J/kg). The overall C.O.P. of the system is therefore $$\frac{700 + 1000 + 1057}{1510} = \frac{2757}{1510} = 1.82$$

It is also follows that 700 BThU/lb ($1.628 \times 10^6$ J/kg) is refrigerated directly when 1510 BThU/lb ($3.51 \times 10^6$ J/kg) is fed into the system whilst 2057 BThU/lb ($4.79 \times 10^6$ J/kg) of refrigeration is stored and may be utilised when no input energy is available.

An air conditioning built according to the principles of this invention is highly suited for operation by solar energy since the high coefficient of performance reduces the size of the investment required in solar panels and the storage capacity incorporated in the apparatus enables the apparatus to be operated under adverse conditions.

When used for heating the apparatus will have an even higher C.O.P. i.e. about 2.9.

A preferred apparatus of the invention is now described with reference to the drawing.

An adsorber 1 houses Y-zeolite molecular sieve 30 which adsorbs water as the adsorbate. The adsorber 1 also houses a heat exchanger 2 connected by piping to a source of heat which is a natural gas fired boiler. Connected to a vapour outlet from the adsorber 1 is a conduit 31 having a valve 3. This conduit 31 is connected to a heat exchanger 4 which is contained in the generator 5 of an absorption air conditioner using water and lithium bromide as the working fluid.

The other end of heat exchanger 4 is connected to conduit 32 which passes through heat exchanger 33 and has an expansion valve 6. This conduit 32 terminates in the top of the evaporator 7 of the air conditioner.

The evaporator 7 is connected to the absorber 13 of the air conditioner by a conduit 34. This conduit 34 has a branch conduit 35 provided with a valve 16 and being connected to the bottom of the adsorber 1.

There is a heat exchanger 17 housed in adsorber 1 in close proximity to the heat exchanger 2. This heat exchanger 17 is connected by conduits 36 and 37 to a heat exchanger 19 which is housed in the generator 5. There is a circulation pump 18 in conduit 37 and conduit 36 is connected to a conduit 38 leading to a header tank (not shown).

In the air conditioner part of the apparatus the top of the generator 5 is connected by conduit 8 to the condenser 9. Heat is rejected to the atmosphere by means of heat exchanger 10 located in the condenser 9.

The bottom of the condenser 9 is connected by conduit 40 provided with expansion valve 11 to the top of the evaporator 7. In this evaporator heat is abstracted from the atmosphere by means of heat exchanger 12.

The generator 5 and absorber 13 are connected together by two conduits 41 and 42. Conduit 41 has pump 14 and conduit 42 has expansion valve 15.

The process operates as follows:

The adsorber 1 housing Y-molecular sieve 2 is stripped of water by heat supplied at 150° C. via heat exchanger 2. This heat is provided by hot heat transfer fluid from a gas-fired boiler (not shown). The water vapour evolved through valve 3 and conduit 31 enters heat exchanger 4 where it condenses at 90° C. The latent heat of condensation actuates the air conditioner in the normal way as explained later.

The condensed water than passes through heat exchanger 33 via conduit 32 where it cools to 40° C. It then expands through expansion valve 6 cooling to 7° C. and enters the evaporator 7. Here heat is abstracted from the temperature, water vaporises and vaporised water is conveyed from the evaporator 7 via conduit 34 to be absorbed by the strong lithium bromide solution in the absorber 13. The heat of absorption is discarded via heat exchanger 20 at about 40° C.

Weak lithium bromide solution is thereafter pumped from absorber 13 by pump 14 via conduit 41 to the bottom of the generator 5. In the generator 5 heat is added to the lithium bromide solution contained therein either by heat exchanger 4 or by heat exchanger 19. Strong lithium bromide solution from the generator 5 descends to the absorber 13 via conduit 42 and expansion valve 15. Whilst this is happening the water driven off from the generator 5 passes through conduit 8 and is condensed in condenser 9. The latent heat of condensation is rejected via heat exchanger 10 at 40° C. and the condensed water is returned to the evaporator 7 via conduit 40 and expansion valve 11.

In this embodiment, the water in heat exchangers 17 and 19 and conduits 36 and 37 is pressurised so that it will not evaporate when heat is supplied to the adsorber 1 at 150° C. As an alternative a low vapour pressure heat transfer fluid can be used instead of pressurised water in this circuit.

As described above the adsorber 1 is being stripped of adsorbate vapour using external heat. When no input heat is available the adsorber 1 can be recharged with adsorbate. This is done by closing valve 3, opening valve 16 and actuating circulation pump 18. This enables vaporised water adsorbate to be drawn from evaporator 7 via conduits 34 and 35 and valve 16 to the adsorbent 30 housed in adsorber 1. Also the actuated circulation pump 18 circulates the water through heat exchangers 17 and 19 via conduits 36 and 37 so that the heat of adsorption is transferred to the generator 5 at 90° C. and actuates the generator 5 in the normal way.

In an alternative arrangement heat exchanger 2 can obtain its heat from a high temperature solar radiation collector. In this case when the adsorber 1 is fully discharged but solar energy is still available it is possible to operate the absorption air conditioner directly by transferring heat from heat exchanger 2 to heat exchanger 17 and via pump 18 and conduits 36 and 37 to heat exchanger 19. The heat exchanger 2 will be heated by liquid from the high temperature solar radiation collector so as to provide heat transfer fluid at 150° C. in the heat exchanger 2.

When the adsorber 1 is activated the output of the air conditioner may be boosted if desired because the absorber and adsorber are then used in parallel, i.e. absorbate is being delivered to the evaporator of the absorber system at the same time as adsorbate is being delivered to the adsorber for adsorption by the adsorbent.

Direct operation of the apparatus when the adsorber 1 is discharged will only give a C.O.P. of 0.7 and is therefore only attractive when solar energy is available. Sequential operation, i.e. discharge of the adsorber 1 and then its recharging, gives a C.O.P. of 1.8. The apparatus of the invention may be used with natural gas to fire the boiler supplying hot heat transfer fluid to heat exchanger 2 on an intermittent basis so that the gas is not consumed at peak hours. The same applied if the boiler is operated by electricity in which case it is used at off-peak periods when it is cheaper.

This use of fuel at off-peak periods, e.g. at night, is only possible because of the fact that potential heat is stored in the system, i.e. in the adsorber.

What is claimed is:

1. A combined absorption and adsorption process comprising:
   (a) supplying heat to an adsorbate loaded adsorbent to vaporize the adsorbate:
   (b) placing said vaporized adsorbate in heat exchange relationship with an absorbate loaded adsorbent in a generator in which the absorbate is the same as the adsorbate and whereby the vaporized adsorbate is condensed and the absorbate is removed from the absorbent;
   (c) circulating absorbate depleted absorbent through an absorber wherein absorbate is replenished and returned to said generator;
   (d) vaporizing said condensed adsorbate by first passing the condensed adsorbate through a heat exchanger and then an expansion valve and finally an evaporator;
   (e) passing said vaporized absorbate through a condenser thereby condensing said absorbate;
   (f) evaporating said absorbate by passinbg the absorbate through an expansion valve and finally said evaporator;
   (g) combining said adsorbate and said absorbate;
   (h) supplying a portion of said combined adsorbate and absorbate to said absorbent in said absorber to reabsorb the absorbate;
   (i) supplying a portion of said combined adsorbate and absorbate to said adsorbent thereby generating heat of adsorption; and
   (j) placing said absorbent and said generator and heat exchanger relationship whereby the heat of adsorption is transferred to said generator.

2. The process according to claim 1 wherein said adsorbent is Y-zeolite molecular sieve and said adsorbate is water.

3. The process of claim 1 wherein said absorbent is lithium bromide and said absorbate is water.

4. Apparatus for carrying out a combined absorption and adsorption process comprising:
   (a) an adsorber housing an adsorbent and having means for supplying heat to the adsorbent from an external source;
   (b) an absorption system including a generator and an absorber containing working fluid therein;
   (c) a first heat exchanger operably connected to said generator;
   (d) a vapor outlet in said adsorber connected by a conduit to said first heat exchanger whereby the vaporized adsorbate is condensed and absorbate is removed from said working fluid in said generator;
   (e) a second heat exchanger means and an expansion valve operably connected to said first heat exchanger for vaporizing said condensed adsorbate;
   (f) a condenser operably connected to said generator of said absorption system whereby vaporized absorbate is transferred from said generator and condensed;
   (g) an evaporating means operably connected to said condenser and said expansion valve whereby said absorbate from said absorbent and said adsorbate from said adsorbent are for transferring a portion of said combined adsorbate and absorbate to the absorber of said absorption system;
   (h) means for transferring a portion of said combined adsorbate and absorbate to the absorber of said absorption system;
   (i) means for circulating working fluid from said generator to said absorber and back to said generator; and
   (j) means for passing portion of said combined adsorbate and absorbate to said adsorbant.

5. The apparatus of claim 4 wherein said first heat exchanger is located within the generator.

* * * * *